United States Patent Office 3,770,838
Patented Nov. 6, 1973

3,770,838
PROCESS FOR PREPARING FLUOROCARBON HALIDES
Robert E. A. Dear and Cyril Woolf, Morristown, N.J., assignors to Allied Chemical Corporation, New York, N.Y.
No Drawing. Filed June 2, 1971, Ser. No. 149,362
Int. Cl. C07c 17/04, 19/08
U.S. Cl. 260—653                               4 Claims

ABSTRACT OF THE DISCLOSURE

Fluorocarbon halides are prepared by reacting an unsaturated fluorocarbon with a cyanogen halide and an ionizable fluoride salt.

---

In accordance with this invention, fluorocarbon halides having the formula

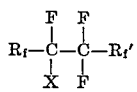

are prepared by reacting a perfluoroalkene having the formula

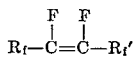

with a cyanogen halide and an ionizable fluoride salt, as represented by the following equation

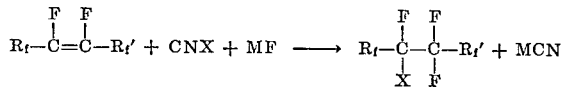

In similar manner, fluorocarbon halides having the formula

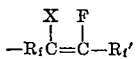

are prepared by reacting a perfluoroalkyne having the formula

$$R_f-C\equiv C-R_{f'}$$

with a cyanogen halide and an ionizable fluoride salt in accordance with the following equation

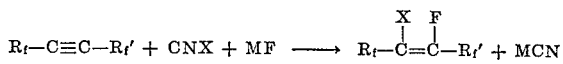

The reactions are carried out in an aprotic, polar liquid reaction medium under substantially anhydrous conditions. In the above formulas: X is chlorine, bromine or iodine, preferably chlorine or bromine; $R_f$ is a perfluoroalkyl radical; $R_{f'}$ is fluorine or a perfluoroalkyl radical; and the total number of carbon atoms in $R_f$ and $R_{f'}$ is from 1 to 12, preferably 1 to 8. $R_f$ and $R_{f'}$ together can form a cyclic alkyl radical.

The fluorocarbon halide product is recovered from the reaction mixture in accordance with conventional methods, such as fractional distillation.

Suitable ionizable fluoride salts include potassium fluoride, rubidium fluoride, cesium fluoride, silver fluoride and tetra(lower alkyl) ammonium fluoride. Potassium fluoride is preferred.

Suitable aprotic, polar, liquid reaction medium include acetonitrile, dimethylformamide, dimethylsulfoxide, dimethylacetamide, glycol ethers, cyclic polymethylene sulfones, and the like.

The reaction is conveniently carried out at room temperature, but temperatures above or below room temperature, e.g. about —40° C. to about 100° C., can be employed if desired. Similarly, the pressure employed is not critical and can be above or below atmospheric pressure as desired. The reaction is conveniently carried out at pressures autogenously developed at the reaction temperatures employed.

The reactants and products of the process of this invention are all well-known compounds of established utility.

The following examples further illustrate the invention. In each example, the reaction was carried out under substantially anhydrous conditions.

EXAMPLE 1

Eight grams of cyanogen chloride and 19.5 grams of perfluoropropylene were added to 8 grams of potassium fluoride and 80 ml. of acetonitrile at —78° C. After the reaction mixture, which was sealed, had warmed to room temperature, the pressure of the reaction mixture rose to a maximum of 56 p.s.i.g. in about 2 hours and then gradually subsided to a constant pressure of 29 p.s.i.g. The volatile component of the reaction mixture was then bled into a trap maintained at —78° C. and identified as hexafluoroisopropyl chloride. The yield was 13.8 grams.

EXAMPLES 2–9

Following the general procedure of Example 1, perfluoro-2-butyne and various perfluoroalkenes were reacted with cyanogen chloride or cyanogen bromide and potassium fluoride or silver fluoride in an aprotic, polar liquid reaction medium. In each instance the desired fluorocarbon halide was obtained in accordance with this invention.

The reactants and reaction media employed in Examples 1–9 are tabulated in Table I below.

TABLE I

| Example | Fluorocarbon reactant | Fluoride salt | Cyanogen halide | Medium | Product |
|---|---|---|---|---|---|
| 1 | CF₃CF=CF₂ | KF | CNCl | CH₃CN | CF₃CFClCF₃ |
| 2 | CF₃CF=CF₂ | KF | CNBr | CH₃CN | CF₃CFBrCF₃ |
| 3 | CF₃CF=CF₂ | KF | CNBr | Sulfolane [1] | CF₃CFBrCF₃ |
| 4 | CF₃CF=CF₂ | KF | CNBr | DMF [2] | CF₃CFBrCF₃ |
| 5 | CF₃CF=CF₂ | AgF | CNBr | CH₃CN | CF₃CFBrCF₃ |
| 6 | CF₃CF=CF₂ | AgF | CNCl | CH₃CN | CF₃CFClCF₃ |
| 7 | Cyclo-C₅F₈ | KF | CNBr | DMF | Cyclo-C₅F₉Br |
| 8 | Cyclo-C₆F₁₀ | KF | CNBr | CH₃CN | Cyclo-C₆F₁₁Br |
| 9 | CF₃C≡CCF₃ | KF | CNBr | Sulfolane | CF₃CF=CBrCF₃ |

[1] Tetramethylenesulfone.
[2] Dimethylformamide.

We claim:
1. A process for preparing a fluorocarbon halide having the formula

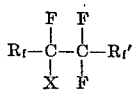

wherein X is chlorine, bromine or iodine, $R_f$ is a perfluoroalkyl radical and $R_{f'}$ is fluorine or a perfluoroalkyl radical, with the total number of carbon atoms in $R_f$ and $R_{f'}$ being from 1 to 12, which process comprises reacting a perfluoroalkene having the formula

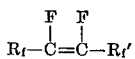

wherein $R_f$ and $R_f'$ are as defined above, with a cyanogen halide having the formula CNX, wherein X is as defined above, and an ionizable fluoride salt selected from the group consisting of potassium fluoride, rubidium fluoride, cesium fluoride, silver fluoride, and tetra(lower alkyl) ammonium fluoride in an aprotic, polar liquid reaction medium under substantially anhydrous conditions.

2. The process of claim 1 wherein the total number of carbon atoms in $R_f$ and $R_f'$ is from 1 to 8.

3. The process of claim 2 wherein the ionizable fluoride salt is potassium fluoride, rubidium fluoride, cesium fluoride, silver fluoride, or tetra(lower alkyl) ammonium fluoride.

4. The process of claim 2 wherein X is chlorine or bromine.

References Cited

Bayer: Chemical Abstracts, 72, 66424J (1970).

DANIEL D. HORWITZ, Primary Examiner

U.S. Cl. X.R.

260—653.3